J. E. GARSTANG.
GRASS CATCHER FOR LAWN MOWERS.
APPLICATION FILED MAR. 21, 1914.
1,125,507.
Patented Jan. 19, 1915.
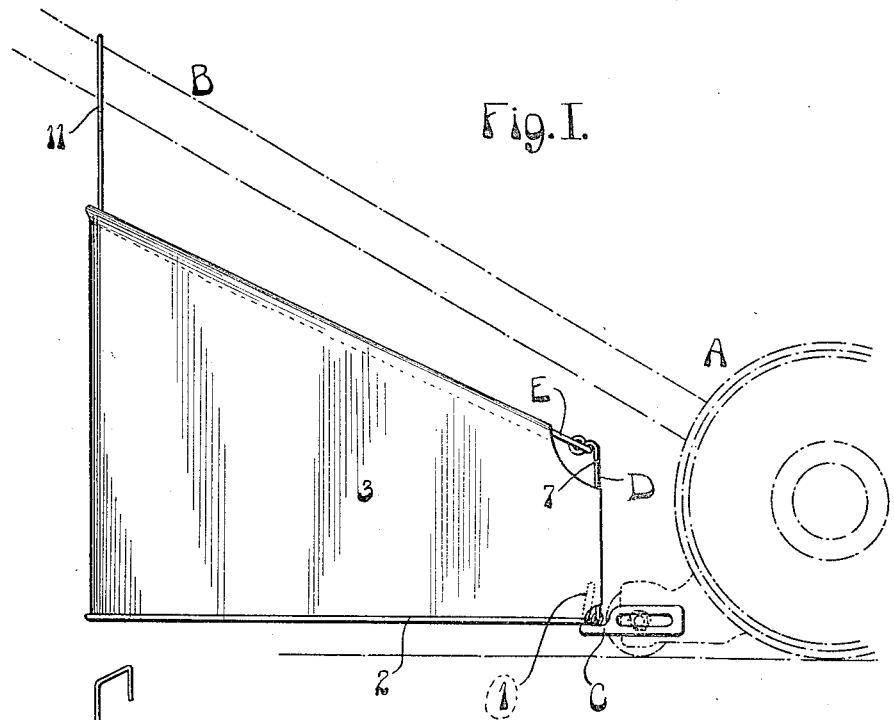
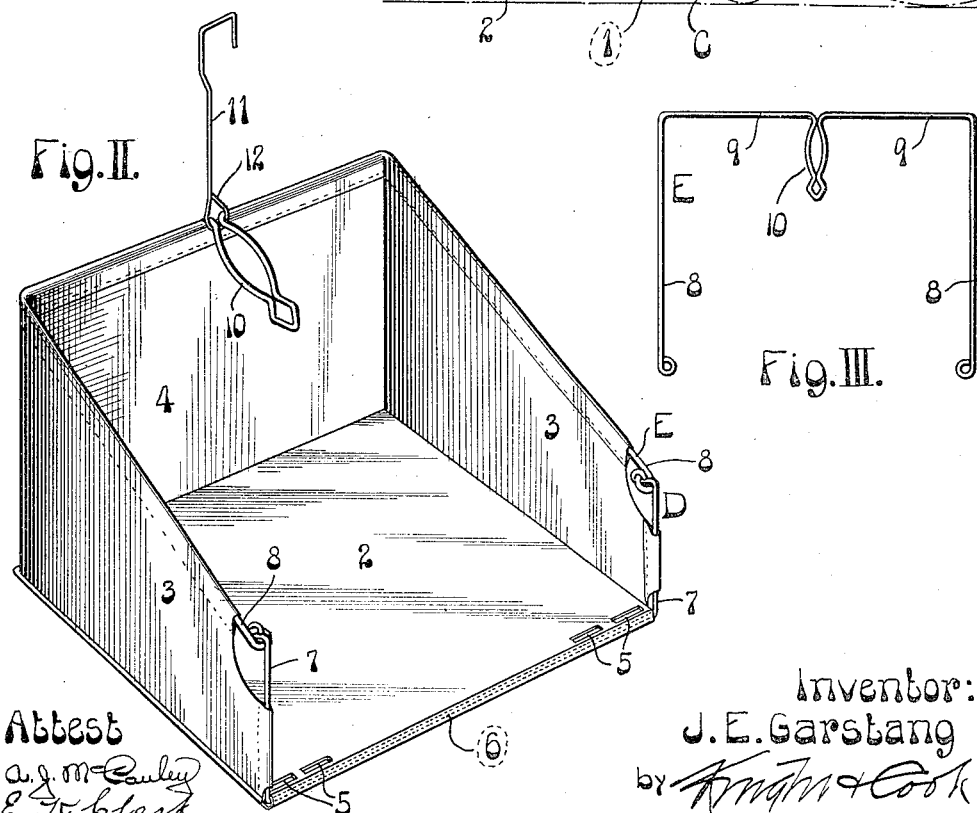
Attest
A. J. McCauley
E. F. Clark
Inventor:
J. E. Garstang
by Knight & Cook
Att'ys.

UNITED STATES PATENT OFFICE.

JAMES E. GARSTANG, OF ST. LOUIS, MISSOURI, ASSIGNOR TO ZITTLOSEN MANUFACTURING COMPANY, OF ST. LOUIS, MISSOURI, A CORPORATION OF MISSOURI.

GRASS-CATCHER FOR LAWN-MOWERS.

1,125,507.   Specification of Letters Patent.   Patented Jan. 19, 1915.

Application filed March 21, 1914. Serial No. 826,175.

*To all whom it may concern:*

Be it known that I, JAMES E. GARSTANG, a citizen of the United States of America, and a resident of the city of St. Louis and the State of Missouri, have invented certain new and useful Improvements in Grass-Catchers for Lawn-Mowers, of which the following is a full, clear, and exact description, reference being had to the accompanying drawings, forming a part of this specification.

My invention relates to a lawn mower, and more particularly to a grass catcher adapted to be carried by the frame and handle of a lawn mower. One of the objects of the invention is to produce a simple and inexpensive grass catcher provided with a handle to be used in lifting and carrying the grass catching receptacle when it is detached from the lawn mower.

The new structure also includes a hook associated with the handle and constituting a support for the rear portion of the grass catching receptacle.

The preferred form of my invention comprises a grass receptacle having a wire frame extending along its upper edge and bent inwardly to form a handle for the receptacle. The handle so formed is preferably a wire loop extending forwardly from the rear edge of the receptacle, and a hook for supporting the rear portion of the receptacle is preferably pivoted to said handle.

Figure I is a side elevation of my grass catcher, showing it attached to a lawn mower, the latter being shown by dotted lines. Fig. II is a perspective view of the grass receptacle. Fig. III is a detail view of the top wire frame.

In the accompanying drawings: A designates a lawn mower provided with a handle B. Hooks C secured to the lawn mower frame, are provided with upturned arms or posts 1 adapted to receive a grass receptacle.

The grass receptacle preferably comprises a sheet metal bottom 2, fabric side walls 3 and a fabric rear wall 4, said fabric walls being secured to the sheet metal bottom 2. The sheet metal bottom is provided with slots 5 for the reception of the arms 1 on the lawn-mower frame.

A wire frame member D is provided with a horizontal portion 6 secured to the front edge of the sheet metal bottom, and arms 7 extending upwardly from said horizontal portion. The front edges of the side walls 3 are secured to the arms 7.

E designates a top wire frame connected to the upper ends of the wire arms 7 and extending along the upper edges of the side and rear walls 3 and 4 respectively. This top frame preferably consists of wire portions 8 passing through loops in the upper edges of the fabric side walls 3, and wire portions 9 passing through loops at the upper edge of the rear wall 4. The wire portions 9 are brought together at the middle of the rear portion of the wire frame E, and a wire loop 10 extends forwardly at this point to form a handle for the receptacle. It will be noted that the loop or handle member 10 is an integral part of the top frame E, the handle member and the top frame being preferably formed of a single piece of wire bent to the shape of a letter "E" as shown in Fig. III.

The front portion of the grass receptacle is detachably secured to the lawn mower by means of the arms 1 which extend through the slots 5 in the bottom of the receptacle, and the rear portion of the receptacle is supported by a hook member 11 pivoted to the receptacle handle at the rear of the receptacle. This hook member is provided with a hook at its upper end adapted to hook over the handle B of the lawn mower.

An eye 12 formed at the lower end of the hook member 11, surrounds the handle member 10 at a point where the wire portions of said handle member lie close to each other, and the bowed portions of the handle member prevent the hook from slipping forwardly over the front end of the handle.

I claim:

1. A grass catcher comprising a receptacle having a top frame consisting of a piece of wire bent at a point midway between its ends to form a loop 10, bent laterally therefrom to produce rear frame members 9 and then forwardly to form side frame members 8, the said loop 10 being extended forwardly from said rear frame members 9 to form a handle for the receptacle.

2. A grass catcher comprising a receptacle having a top frame consisting of a piece of wire bent at a point midway between its end to form a loop 10, bent laterally therefrom to produce rear frame members 9 and then forwardly to form side frame members 8, the middle portions of the wire forming said loop being bowed away from each other to produce a handle.

3. A grass catcher comprising a receptacle having a bottom wall, fabric side walls and a fabric rear wall, said fabric walls being provided with loops at their upper edges, and a substantially E-shaped frame composed of a single piece of wire passing through said loops, the middle portion of the substantially E-shaped piece of wire being extended inwardly from the upper margin of said rear wall to provide a handle for the receptacle.

4. A grass catcher comprising a receptacle having a bottom wall, side walls, and a rear wall, a top wire frame consisting of a piece of wire extending along the upper edge of said side walls, brought together at the middle of the upper edge of said rear wall and extended forwardly therefrom to produce a handle, said handle being integrally connected to said top wire frame, and a hook pivotally connected to said wire frame at the point where the wire member is extended to form the handle.

JAMES E. GARSTANG.

In the presence of—
E. K. CLARK,
M. M. APGAR.

Copies of this patent may be obtained for five cents each, by addressing the "Commissioner of Patents, Washington, D. C."